(12) United States Patent
Wu et al.

(10) Patent No.: US 11,593,319 B2
(45) Date of Patent: Feb. 28, 2023

(54) VIRTUALIZED DATA STORAGE SYSTEM ARCHITECTURE

(71) Applicant: Riverbed Technology, Inc., San Francisco, CA (US)

(72) Inventors: David Tze-Si Wu, San Francisco, CA (US); Steven McCanne, Berkeley, CA (US); Michael J. Demmer, San Francisco, CA (US); Nitin Gupta, Fremont, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 102 days.

(21) Appl. No.: 16/849,888

(22) Filed: Apr. 15, 2020

(65) Prior Publication Data

US 2020/0242088 A1 Jul. 30, 2020

Related U.S. Application Data

(62) Division of application No. 12/730,185, filed on Mar. 23, 2010, now Pat. No. 10,831,721.

(60) Provisional application No. 61/162,463, filed on Mar. 23, 2009.

(51) Int. Cl.
*G06F 16/188* (2019.01)
*G06F 16/172* (2019.01)
*G06F 12/0862* (2016.01)
*G06F 3/06* (2006.01)

(52) U.S. Cl.
CPC ........ *G06F 16/188* (2019.01); *G06F 12/0862* (2013.01); *G06F 16/172* (2019.01); *G06F 3/067* (2013.01); *G06F 3/0643* (2013.01); *G06F 3/0653* (2013.01); *G06F 2212/6024* (2013.01)

(58) Field of Classification Search
None
See application file for complete search history.

(56) References Cited

U.S. PATENT DOCUMENTS 7,849,257 B1 * 12/2010 Kim ...................... G06F 3/0673
711/112
2005/0044162 A1 * 2/2005 Liang .................. H04L 67/1097
709/212

(Continued)

*Primary Examiner* — Dawaune A Conyers
(74) *Attorney, Agent, or Firm* — Park, Vaughan, Fleming & Dowler LLP; Laxman Sahasrabuddhe

(57) ABSTRACT

Virtual storage arrays consolidate branch data storage at data centers connected via wide area networks. Virtual storage arrays appear to storage clients as local data storage; however, virtual storage arrays actually store data at the data center. The virtual storage arrays overcomes bandwidth and latency limitations of the wide area network by predicting and prefetching storage blocks, which are then cached at the branch location. Virtual storage arrays leverage an understanding of the semantics and structure of high-level data structures associated with storage blocks to predict which storage blocks are likely to be requested by a storage client in the near future. Virtual storage arrays determine the association between requested storage blocks and corresponding high-level data structure entities to predict additional high-level data structure entities that are likely to be accessed. From this, the virtual storage array identifies the additional storage blocks for prefetching.

12 Claims, 8 Drawing Sheets

(56) References Cited

U.S. PATENT DOCUMENTS

| | | | |
|---|---|---|---|
| 2005/0172080 A1* | 8/2005 | Miyauchi | G06F 12/121 |
| | | | 711/136 |
| 2006/0168118 A1* | 7/2006 | Godlin | G06F 16/1767 |
| | | | 709/218 |
| 2008/0140997 A1* | 6/2008 | Tripathi | G06F 12/0862 |
| | | | 712/207 |

* cited by examiner

Storage Block Writes WAN Queue

| Write Operation | 1 | 2 | 3 | 4 | 5 | 6 | 7 | 8 | 9 | 10 |
|---|---|---|---|---|---|---|---|---|---|---|
| Storage Block | 4 | 3 | 4 | 3 | 4 | 2 | 3 | 1 | 2 | 5 |

Snapshot A | Snapshot B

Storage Block WAN Transmission Order
Most Recent Writes Only

| Write Operation | 5 | 7 | 8 | 9 | 10 |
|---|---|---|---|---|---|
| Storage Block | 4 | 3 | 1 | 2 | 5 |

Snapshot B

Storage Block WAN Transmission Order
Snapshot Aware Writes

| Write Operation | 2 | 3 | 5 | 6 | 7 | 8 | 9 | 10 |
|---|---|---|---|---|---|---|---|---|
| Storage Block | 3 | 4 | 4 | 2 | 3 | 1 | 2 | 5 |

Snapshot A | Snapshot B

VIRTUALIZED DATA STORAGE SYSTEM ARCHITECTURE

CROSS-REFERENCE TO RELATED APPLICATIONS

This application is a divisional of U.S. application Ser. No. 12/730,185, filed on 23 Mar. 2010, which claims benefit of U.S. Provisional Patent Application No. 61/162,463, entitled "Virtualized Data Storage Over Wide-Area Networks", filed Mar. 23, 2009. The subject matter of this application is related to the subject matter of (1) U.S. application Ser. No. 12/730,179, filed 23 Mar. 2010, (2) U.S. application Ser. No. 12/730,192, filed 23 Mar. 2010, and (3) U.S. application Ser. No. 12/730,198, filed 23 Mar. 2010 (which issued as U.S. Pat. No. 9,348,842). The contents of all of the above-mentioned applications are herein incorporated by reference in their entirety for all purposes.

BACKGROUND

The present invention relates generally to data storage systems, and systems and methods to improve storage efficiency, compactness, performance, reliability, and compatibility. Enterprises often span geographical locations, including multiple corporate sites, branch offices, and data centers, all of which are generally connected over a wide-are network (WAN). Although in many cases, servers are run in a data center and accessed over the network, there are also cases in which servers need to be run in distributed locations at the "edges" of the network. These network edge locations are generally referred to as branch locations in this application, regardless of the purposes of these locations. The need to operate servers at branch locations may arise from variety of reasons, including efficiently handling large amounts of newly written data and ensuring service availability during WAN outages.

The need to run servers at branch locations in a network, as opposed to a centralized data center location, leads to a corresponding requirement for data storage for those servers at the branch locations, both to store the operating system data for branch servers, in some cases, for user or application data. The branch data storage requires maintenance and administration, including proper sizing for future growth, data snapshots, archives, and backups, and replacements and/or upgrades of storage hardware and software when the storage hardware or software fails or branch data storage requirements change.

Although the maintenance and administration of data storage in general incurs additional costs, branch data storage is more expensive and inefficient than consolidated data storage at a centralized data center. Organizations often require on-site personnel at each branch location to configure and upgrade each branch's data storage, and to manage data backups and data retention. Additionally, organizations often purchase excess storage capacity for each branch location to allow for upgrades and growing data storage requirements. Because branch locations are serviced infrequently, due to their numbers and geographic dispersion, organizations often deploy enough data storage at each branch location to allow for months or years of storage growth. However, this excess storage capacity often sits unused for months or years until it is needed, unnecessarily driving up costs.

Although the consolidation of information technology infrastructure decreases costs and improves management efficiency, branch data storage is rarely consolidated at a network branch location, because the intervening WAN is slow and has high latency, making storage accesses unacceptably slow for branch client systems and application servers. Thus, organizations have previously been unable to consolidate data storage from multiple branches.

BRIEF DESCRIPTION OF THE DRAWINGS

The invention will be described with reference to the drawings, in which:

FIGS. 4A-4C illustrate write order preservation policies according to embodiments of the invention;

SUMMARY

Figure 1:
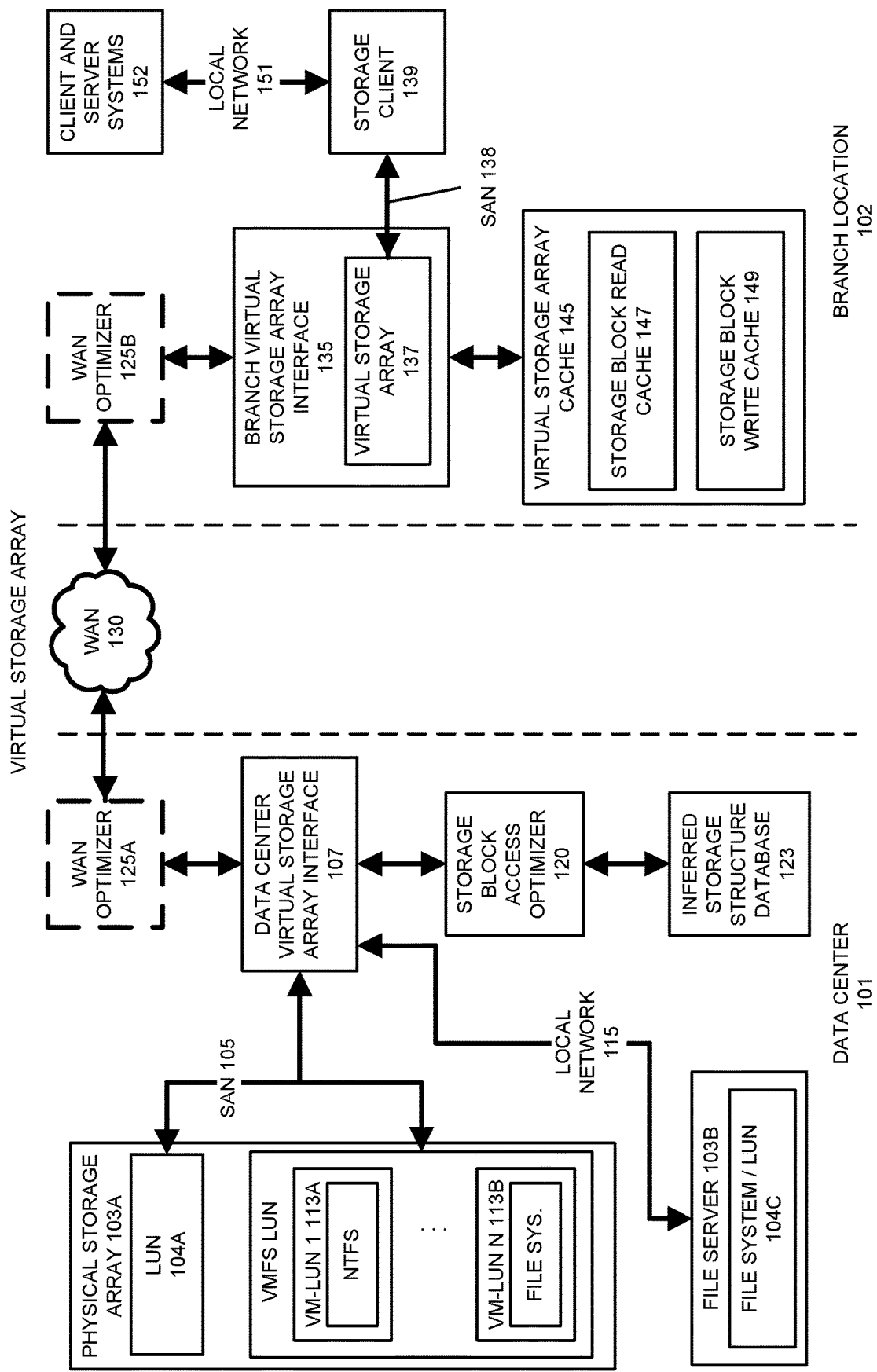
FIG. 1 illustrates a virtualized data storage system architecture according to an embodiment of the invention.

An embodiment of the invention uses virtual storage arrays to consolidate branch location-specific data storage at data centers connected with branch locations via wide area networks. The virtual storage array appears to a storage client as a local branch data storage; however, embodiments of the invention actually store the virtual storage array data at a data center connected with the branch location via a wide-area network. In embodiments of the invention, a branch storage client accesses the virtual storage array using storage block based protocols.

Embodiments of the invention overcome the bandwidth and latency limitations of the wide area network between branch locations and the data center by predicting storage blocks likely to be requested in the future by the branch storage client and prefetching and caching these predicted storage blocks at the branch location. When this prediction is successful, storage block requests from the branch storage client may be fulfilled in whole or in part from the branch location' storage block cache. As a result, the latency and bandwidth restrictions of the wide-area network are hidden from the storage client.

The branch location storage client uses storage block-based protocols to specify reads, writes, modifications, and/or deletions of storage blocks. However, servers and higher-level applications typically access data in terms of files in a structured file system, relational database, or other high-level data structure. Each entity in the high-level data structure, such as a file or directory, or database table, node, or row, may be spread out over multiple storage blocks at various non-contiguous locations in the storage device. Thus, prefetching storage blocks based solely on their locations in the storage device is unlikely to be effective in hiding wide-area network latency and bandwidth limits from storage clients.

An embodiment of the invention leverages an understanding of the semantics and structure of the high-level data structures associated with the storage blocks to predict which storage blocks are likely to be requested by a storage client in the near future. To do this, an embodiment of the invention determines the association between requested storage blocks and the corresponding high-level data structure entities, such as files, directories, or database elements. Once this embodiment has identified one or more of the high-level data structure entities associated with a requested storage block, this embodiment of the invention identifies additional portions of the same or other high-level data structure entities that are likely to be accessed by the storage client. This embodiment of the invention then identifies the additional storage blocks corresponding to these additional high-level data structure entities. The additional storage blocks are then prefetched and cached at the branch location.

Another embodiment of the invention analyzes a selected high-level data structure entity to identify portions of the same or other high-level data structure entities that is likely to be accessed by the storage client. This embodiment of the invention then identifies the additional storage blocks corresponding to these additional high-level data structure entities. The additional storage blocks are then prefetched and cached at the branch location. This embodiment of the invention may also identify additional high-level data structure entities to analyze based on its analysis of previously selected high-level data structure entities.

Further embodiments of the invention may identify corresponding high-level data structure entities directly from requests for storage blocks. Additionally, embodiments of the invention may successively apply any number of successive transformations to storage block requests to identify associated high-level data structure entities. These successive transformations may include transformations to intermediate level data structure entities. Intermediate and high-level data structure entities may include virtual machine data structures, such as virtual machine file system files, virtual machine file system storage blocks, virtual machine storage structures, and virtual machine disk images.

DETAILED DESCRIPTION OF ILLUSTRATIVE EMBODIMENTS

FIG. 1 illustrates a virtualized data storage system architecture 100 according to an embodiment of the invention. Virtualized data storage system architecture 100 includes a data center 101 connected with at least one branch network location 102 via a wide-area network (WAN) 130. Each branch location 102 includes at least one storage client 139, such as a file server, application server, database server, or storage area network (SAN) interface. A storage client 139 may be connected with a local-area network (LAN) 151, including routers, switches, and other wired or wireless network devices, for connecting with server and client systems and other devices 152.

Previously, typical branch location installations also required a local physical data storage device for the storage client. For example, a prior typical branch location LAN installation may include a file server for storing data for the client systems and application servers, such as database servers and e-mail servers. In prior systems, this branch location's data storage is located at the branch location site and connected directly with the branch location LAN or SAN. The branch location physical data storage device previously could not be located at the data center 101, because the intervening WAN 130 is too slow and has high latency, making storage accesses unacceptably slow for storage clients.

An embodiment of the invention allows for storage consolidation of branch location-specific data storage at data centers connected with branch locations via wide area networks. This embodiment of the invention overcomes the bandwidth and latency limitations of the wide area network between branch locations and the data center. To this end, an embodiment of the invention includes virtual storage arrays.

In an embodiment, the branch location 102 includes a virtual storage array interface device 135. The virtual storage array interface device 135 presents a virtual storage array 137 to branch location users, such as the branch location storage client 139. A virtual storage array 137 can be used for the same purposes as a local storage area network or other data storage device. For example, a virtual storage array 137 may be used in conjunction with a file server for general-purpose data storage, in conjunction with a database server for database application storage, or in conjunction with an e-mail server for e-mail storage. However, the virtual storage array 137 stores its data at a data center 101 connected with the branch location 102 via a wide area network 130. Multiple separate virtual storage arrays, from different branch locations, may store their data in the same data center and, as described below, on the same physical storage devices.

Because the data storage of multiple branch locations is consolidated at a data center, the efficiency, reliability, cost-effectiveness, and performance of data storage is improved. An organization can manage and control access to their data storage at a central data center, rather than at large numbers of separate branch locations. This increases the reliability and performance of an organization's data storage. This also reduces the personnel required at branch location offices to provision, maintain, and backup data storage. It also enables organizations to implement more effective backup systems, data snapshots, and disaster recovery for their data storage. Furthermore, organizations can plan for storage growth more efficiently, by consolidating their storage expansion for multiple branch locations and reducing the amount of excess unused storage. Additionally, an organization can apply optimizations such as compression or data deduplication over the data from multiple branch locations stored at the data center, reducing the total amount of storage required by the organization.

In an embodiment, virtual storage array interface 135 may be a stand-alone computer system or network appliance or built into other computer systems or network equipment as hardware and/or software. In a further embodiment, a branch location virtual storage array interface 135 may be implemented as a software application or other executable code running on a client system or application server.

In an embodiment, a branch location virtual storage array interface 135 includes one or more storage array network interfaces and supports one or more storage block network protocols to connect with one or more storage clients 139 via a local storage area network (SAN) 138. Examples of storage array network interfaces suitable for use with embodiments of the invention include Ethernet, Fibre Channel, IP, and InfiniB and interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. In cases where the storage array network interface uses Ethernet, an embodiment of the branch location virtual storage array interface can use the branch location LAN's physical connections and networking equipment for communicating with client systems and application services. In other embodiments, separate connections and networking equipment, such as Fibre Channel networking equipment, is used to connect the branch location virtual storage array interface with client systems and/or application services.

It should be noted that the branch location virtual storage array interface 135 allows storage clients to access data in the virtual storage array via storage block protocols, unlike file servers that utilize file-based protocols. Thus, the virtual storage array 137 may be accessed by any type of storage client in the same manner as a local physical storage device or storage array. Furthermore, applications executed by the storage client 139 or other client and server systems 152 may access the virtual storage array in the same manner as a local physical storage device or storage array.

In an embodiment, the storage client 139 is included in a file server that also provide a network file interface to the virtual storage array 137 to client systems and other application servers. In a further embodiment, the branch location virtual storage array interface 135 is integrated as hardware and/or software with an application server, such as a file server, database server, or e-mail server. In this embodiment, the branch location virtual storage array interface 135 can include application server interfaces, such as a network file interface, for interfacing with other application servers and/or client systems.

A branch location virtual storage array interface 135 presents a virtual storage array 137 to one or more storage clients 139. To the storage client 139, the virtual storage array 137 appears to be a local storage array, having its physical data storage at the branch location 102. However, the branch location virtual storage array interface 135 actually stores and retrieves data from physical data storage devices located at the data center 101. Because virtual storage array data accesses must travel via the WAN 130 between the data center 101 LAN to a branch location 102 LAN, the virtual storage array 137 is subject to the latency and bandwidth restrictions of the WAN 130.

In an embodiment, the branch location virtual storage array interface 135 includes a virtual storage array cache 145, which is used to ameliorate the effects of the WAN 130 on virtual storage array 137 performance. In an embodiment, the virtual storage array cache 145 includes a storage block read cache 147 and a storage block write cache 149.

The storage block read cache 147 is adapted to store local copies of storage blocks requested by storage client 139. As described in detail below, the virtualized data storage system architecture 100 may attempt to predict which storage blocks will be requested by the storage client 139 in the future and preemptively send these predicted storage blocks from the data center 101 to the branch 102 via WAN 130 for storage in the storage block read cache 147. If this prediction is partially or wholly correct, then when the storage client 139 eventually requests one or more of these prefetched storage blocks from the virtual storage array 137, an embodiment of the virtual storage array interface 135 can fulfill this request using local copies of the requested storage blocks from the block read cache 145. By fulfilling access requests using prefetched local copies of storage blocks from the block read cache 145, the latency and bandwidth restrictions of WAN 130 are hidden from the storage client 139. Thus, from the perspective of the storage client 139, the virtual storage array 137 appears to perform storage block read operations as if the physical data storage were located at the branch location 102.

Similarly, the storage block write cache 149 is adapted to store local copies of new or updated storage blocks written by the storage client 139. As described in detail below, the storage block write cache 149 temporarily stores new or updated storage blocks written by the storage client 139 until these storage blocks are copied back to physical data storage at the data center 101 via WAN 130. By temporarily storing new and updated storage blocks locally at the branch location 102, the bandwidth and latency of the WAN 130 is hidden from the storage client 139. Thus, from the perspective of the storage client 139, the virtual storage array 137 appears to perform storage block write operations as if the physical data storage were located at the branch location 102.

In an embodiment, the virtual storage array cache 145 includes non-volatile and/or redundant data storage, so that data in new or updated storage blocks are protected from system failures until they can be transferred over the WAN 130 and stored in physical data storage at the data center 101.

In an embodiment, the branch location virtual storage array interface 135 operates in conjunction with a data center virtual storage array interface 107. The data center virtual storage array interface 107 is located on the data center 101 LAN and may communicate with one or more branch location virtual storage array interfaces via the data center 101 LAN, the WAN 130, and their respective branch location LANs. Data communications between virtual storage array interfaces can be in any form and/or protocol used for carrying data over wired and wireless data communications networks, including TCP/IP.

In an embodiment, data center virtual storage array interface 107 is connected with one or more physical data storage devices 103 to store and retrieve data for one or more virtual storage arrays, such as virtual storage array 137. To this end, an embodiment of a data center virtual storage array interface 107 accesses a physical storage array network interface, which in turn accesses physical data storage array 103a on a storage array network (SAN) 105. In another embodiment, the data center virtual storage array interface 107 includes one or more storage array network interfaces and supports one or more storage array network protocols for directly connecting with a physical storage array network 105 and its physical data storage array 103a. Examples of storage array network interfaces suitable for use with embodiments of the invention include Ethernet, Fibre Channel, IP, and InfiniB and interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. Embodiments of the data center virtual storage array interface 107 may connect with the physical storage array interface and/or directly with the physical storage array network 105 using the Ethernet network of the data center LAN and/or separate data communications connections, such as a Fibre Channel network.

In another embodiment, data center virtual storage array interface 107 may store and retrieve data for one or more virtual storage arrays, such as virtual storage array 137, using a network storage device, such as file server 103b. File server 103b may be connected with data center virtual storage array 137 via local-area network (LAN) 115, such as an Ethernet network, and communicate using a network file system protocol, such as NFS, SMB, or CIFS.

Embodiments of the data center virtual storage array interface 107 may utilize a number of different arrangements to store and retrieve virtual storage array data with physical data storage array 103*a* or file server 103*b*. In one embodiment, the virtual data storage array 137 presents a virtualized logical storage unit, such as an iSCSI or FibreChannel logical unit number (LUN), to storage client 139. This virtual logical storage unit is mapped to a corresponding logical storage unit 104*a* on physical data storage array 103*a*. Data center virtual storage array interface 107 stores and retrieves data for this virtualized logical storage unit using a non-virtual logical storage unit 104*a* provided by physical data storage array 103*a*. In a further embodiment, the data center virtual data storage array interface 107 supports multiple branch locations and maps each storage client's virtualized logical storage unit to a different non-virtual logical storage unit provided by physical data storage array 103*a*.

In another embodiment, virtual data storage array interface 107 maps a virtualized logical storage unit to a virtual machine file system 104*b*, which is provided by the physical data storage array 103*a*. Virtual machine file system 104*b* is adapted to store one or more virtual machine disk images 113, each representing the configuration and optionally state and data of a virtual machine. Each of the virtual machine disk images 113, such as virtual machine disk images 113*a* and 113*b*, includes one or more virtual machine file systems to store applications and data of a virtual machine. To a virtual machine application, its virtual machine disk image 113 within the virtual machine file system 104*b* appears as a logical storage unit. However, the complete virtual machine file system 104*b* appears to the data center virtual storage array interface 107 as a single logical storage unit.

In another embodiment, virtual data storage array interface 107 maps a virtualized logical storage unit to a logical storage unit or file system 104*c* provided by the file server 103*c*.

As described above, storage clients can interact with virtual storage arrays in the same manner that they would interact with physical storage arrays. This includes issuing storage commands to the branch location virtual storage interface using storage array network protocols such as iSCSI or Fibre Channel protocol. Most storage array network protocols organize data according to storage blocks, each of which has a unique storage address or location. A storage block's unique storage address may include logical unit number (using the SCSI protocol) or other representation of a logical volume.

In an embodiment, the virtual storage array provided by a branch location virtual storage interface allows a storage client to access storage blocks by their unique storage address within the virtual storage array. However, because one or more virtual storage arrays actually store their data within one or more of the physical data storage devices 103, an embodiment of the invention allows arbitrary mappings between the unique storage addresses of storage blocks in the virtual storage array and the corresponding unique storage addresses in one or more physical data storage devices 103. In an embodiment, the mapping between virtual and physical storage address may be performed by a branch location virtual storage array interface 137 and/or by data center virtual storage array interface 107. Furthermore, there may be multiple levels of mapping between the addresses of storage blocks in the virtual storage array and their corresponding addresses in the physical storage device.

In an embodiment, storage blocks in the virtual storage array may be of a different size and/or structure than the corresponding storage blocks in a physical storage array or data storage device. For example, if data compression is applied to the storage data, then the physical storage array data blocks may be smaller than the storage blocks of the virtual storage array to take advantage of data storage savings. In an embodiment, the branch location and/or data center virtual storage array interfaces map one or more virtual storage array storage blocks to one or more physical storage array storage blocks. Thus, a virtual storage array storage block can correspond with a fraction of a physical storage array storage block, a single physical storage array storage block, or multiple physical storage array storage blocks, as required by the configuration of the virtual and physical storage arrays.

In a further embodiment, the branch location and data center virtual storage array interfaces may reorder or regroup storage operations from storage clients to improve efficiency of data optimizations such as data compression. For example, if two storage clients are simultaneously accessing the same virtual storage array, then these storage operations will be intermixed when received by the branch location virtual storage array interface. An embodiment of the branch location and/or data center virtual storage array interface can reorder or regroup these storage operations according to storage client, type of storage operation, data or application type, or any other attribute or criteria to improve virtual storage array performance and efficiency. For example, a virtual storage array interface can group storage operations by storage client and apply data compression to each storage client's operations separately, which is likely to provide greater data compression than compressing all storage operations together.

As described above, an embodiment of the virtualized data storage system architecture 100 attempts to predict which storage blocks will be requested by a storage client in the near future, prefetches these storage blocks from the physical data storage devices 103, and forwards these to the branch location 102 for storage in the storage block read cache 147. When this prediction is successful and storage block requests may be fulfilled in whole or in part from the block read cache 147, the latency and bandwidth restrictions of the WAN 130 are hidden from the storage client. An embodiment of the virtualized data storage system architecture 100 includes a storage block access optimizer 120 to select storage blocks for prefetching to storage clients. In an embodiment, the storage block access optimizer 120 is located at the data center 101 and is connected or incorporated into the data center virtual data storage array interface 107. In an alternate embodiment, the storage block access optimizer 120 may be located at the branch location 102 and be connected with or incorporated into the branch location virtual data storage interface 135.

As discussed above, storage devices such as physical data storage arrays and the virtual data storage array are accessed using storage block-based protocols. A storage block is a sequence of bytes or bits of data. Data storage devices represent their data storage as a set of storage blocks that may be used to store and retrieve data. The set of storage blocks is an abstraction of the underlying hardware of a physical or virtual data storage device. Storage clients use storage block-based protocols to specify reads, writes, modifications, and/or deletions of storage blocks. However, servers and higher-level applications typically access data in terms of files in a structured file system, relational database, or other high-level data structure. Each entity in the high-level data structure, such as a file or directory, or database table, node, or row, may be spread out over multiple storage blocks at various non-contiguous locations in the storage device. Thus, prefetching storage blocks based solely on their location in the storage device is unlikely to be effective in hiding WAN latency and bandwidth limits from storage clients.

In an embodiment, the storage block access optimizer 120 leverages an understanding of the semantics and structure of the high-level data structures associated with the storage blocks to predict which storage blocks are likely to be requested by a storage client in the near future. To do this, the storage block access optimizer 120 must be able to determine the association between storage blocks and its high-level data structure. An embodiment of the storage block access optimizer 120 uses an inferred storage structure database (ISSD) 123 to match storage blocks with their associated entity in the high-level data structure. For example, given a specific storage block location, the storage block access optimizer 120 may use the ISSD 123 to identify the file or directory in a file system, or the database table, record, or node, that is using this storage block to store some or all of its data.

Once the storage block access optimizer 120 has identified the high-level data structure entity associated with a storage block, the storage block access optimizer 120 may employ a number of different techniques to predict which additional storage blocks are likely to be requested by a storage client. For example, storage block access optimizer 120 may observe requests from a storage client 139 for storage blocks from the virtual data storage array 137, identify the high-level data structure entities associated with the requested storage blocks, and select additional storage blocks associated with these or other high-level data structure entities for prefetching. These types of storage block prefetching techniques are referred to as reactive prefetching. In another example, the storage block access optimizer 120 may analyze entities in the high-level data structures, such as files, directories, or database entities, to identify specific entities or portions thereof that are likely to be requested by the storage client 139. Using the ISSD 123, the storage block access optimizer 120 identifies storage blocks corresponding with these identified entities or portions thereof and prefetches these storage blocks for storage in the block read cache 147 at the branch location 102. These types of storage block prefetching techniques are referred to as policy-based prefetching. Further examples of reactive and policy-based prefetching are discussed below. Embodiments of the storage block access optimizer 120 may utilize any combination of reactive and policy-based prefetching techniques to select storage blocks to be prefetched and stored in the block read cache 147 at the branch location 102.

In a further embodiment, the branch location 102 and data center location 101 may optionally include network optimizers 125 for improving the performance of data communications over the WAN between branches and/or the data center. Network optimizers 125 can improve actual and perceived WAN network performance using techniques including compressing data communications; anticipating and prefetching data; caching frequently accessed data; shaping and restricting network traffic; and optimizing usage of network protocols. In an embodiment, network optimizers 125 may be used in conjunction with virtual data storage array interfaces 107 and 135 to further improve virtual storage array 137 performance for storage blocks accessed via the WAN 130. In other embodiments, network optimizers 125 may ignore or pass-through virtual storage array 137 data traffic, relying on the virtual storage array interfaces 107 and 135 at the data center 101 and branch location 102 to optimize WAN performance.

Further embodiments of the invention may be used in different network architectures. For example, a data center virtual storage array interface 107 may be connected directly between WAN 130 and a physical data storage array 103, eliminating the need for a data center LAN. Similarly, a branch location virtual storage array interface 135, implemented for example in the form of a software application executed by a storage client computer system, may be connected directly with WAN 130, such as the internet, eliminating the need for a branch location LAN. In another example, the data center and branch location virtual data storage array interfaces 107 and 135 may be combined into a single unit, which may be located at the branch location 102.

Figure 2A:
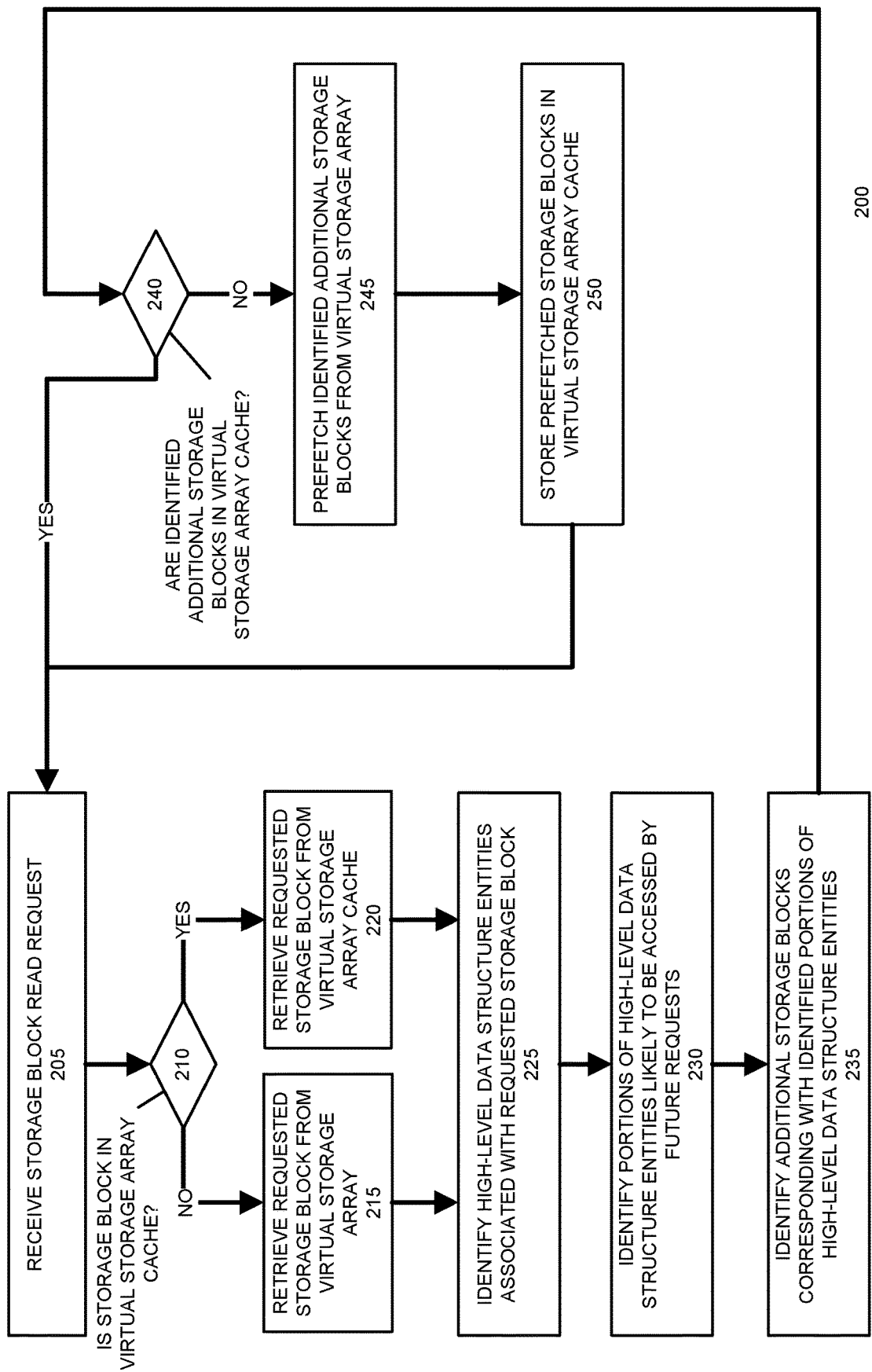
FIGS. 2A-2B illustrate methods of prefetching storage blocks to improve virtualized data storage system performance according to embodiments of the invention.
Figure 2B:
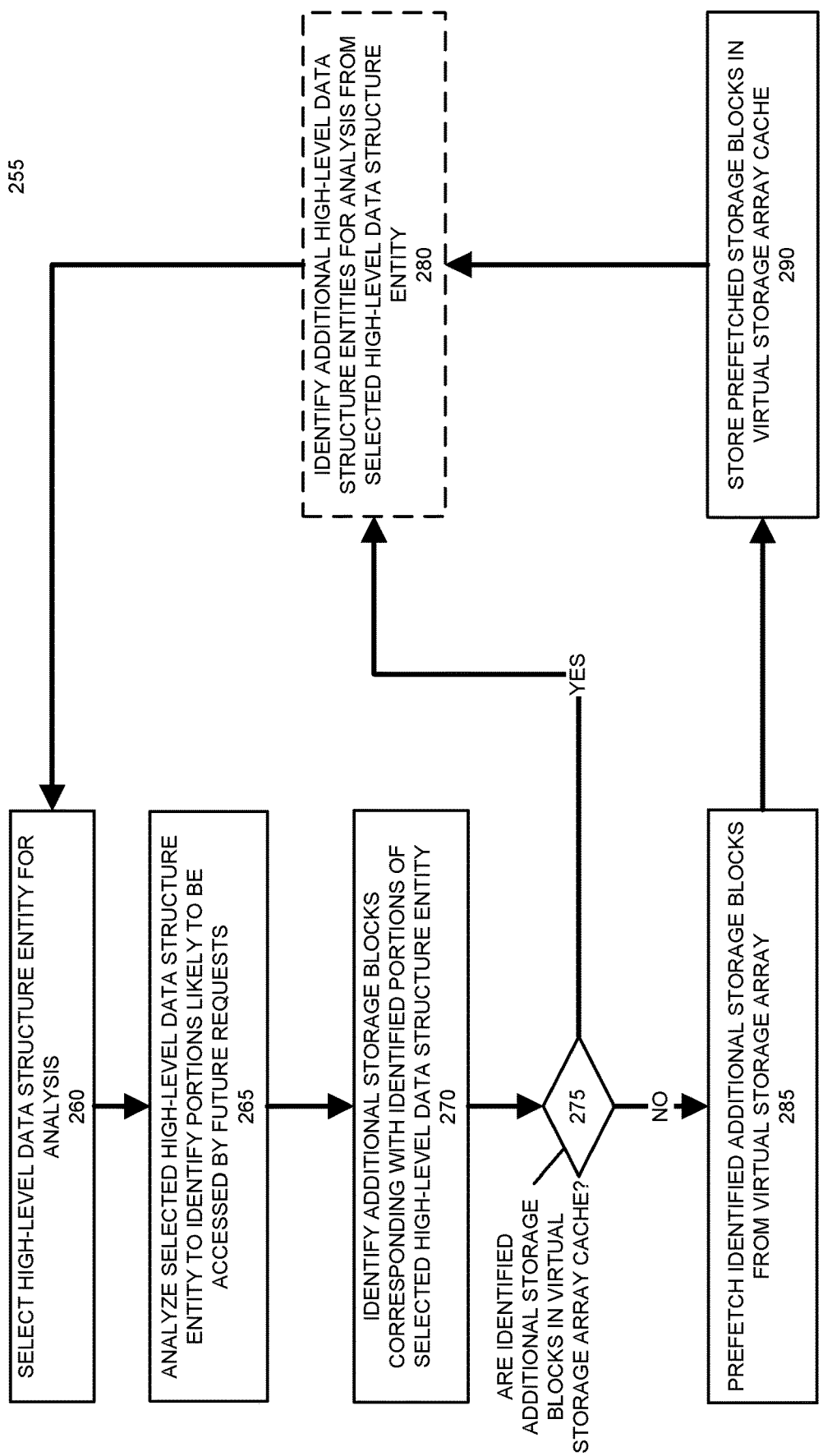

FIGS. 2A-2B illustrate methods of prefetching storage blocks to improve virtualized data storage system performance according to embodiments of the invention. FIG. 2A illustrates a method 200 of performing reactive prefetching of storage blocks according to an embodiment of the invention. Step 205 receives a storage block read request from a storage client at the branch location. In an embodiment, the storage block read request may be received by a branch location virtual data storage array interface.

In response to the receipt of the storage block read request in step 205, decision block 210 determines if the requested storage block has been previously retrieved and stored in the storage block read cache at the branch location. If so, step 220 retrieves the requested storage block from the storage block read cache and returns it to the requesting storage client. In an embodiment, if the system includes a data center virtual storage array interface, then step 220 also forwards the storage block read request back to the data center virtual storage array interface for use in identifying additional storage blocks likely to be requested by the storage client in the future.

If the storage block read cache at the branch location does not include the requested storage block, step 215 retrieves the requested storage block via a WAN connection from the virtual storage array data located in a physical data storage at the data center. In an embodiment, a branch location virtual storage array interface forwards the storage block read request to the data center virtual storage array interface via the WAN connection. The data center virtual storage array interface then retrieves the requested storage block from the physical storage array and returns it to the branch location virtual storage array interface, which in turn provides this requested storage block to the storage client. In a further embodiment of step 215, a copy of the retrieved storage block may be stored in the storage block read cache for future accesses.

During and/or following the retrieval of the requested storage block from the virtual storage array or virtual storage array cache, steps 225 to 250 prefetch additional storage blocks likely to be requested by the storage client in the near future. Step 225 identifies the high-level data structure entity associated with the requested storage block. Typical block storage protocols, such as iSCSI and FCP, specify block read requests using a storage block address or identifier. However, these storage block read requests do not include any identification of the high-level data structure, such as a file, directory, or database entity, that is associated with this storage block. Therefore, an embodiment of step 225 accesses an ISSD to identify the high-level data structure associated with the requested storage block.

In an embodiment, step 225 provides the ISSD with the storage block address or identifier. In response, the ISSD returns an identifier of the high-level data structure entity associated with the requested storage block. The identifier of the high-level data structure entity may be an inode or similar file system identifier or a database storage structure identifier, such as a database table or B-tree node. In a further embodiment, the ISSD also includes a location within the high-level data structure entity corresponding with the requested storage block. For example, step 225 may provide a storage block identifier to the ISSD and in response receive the inode or other file system identifier for a file stored in this storage block. Additionally, the ISSD can return an offset, index, or other file location indicator that specifies the portion of this file stored in the storage block.

Using the identification of the high-level data structure entity and optionally the location provided by the ISSD, step 230 identifies additional high-level data structure entities or portions thereof that are likely to be requested by the storage client. There are a number of different techniques for identifying addition high-level data structure entities or portions thereof for prefetching that may be used by embodiments of step 230. Some of these are described in detail in U.S. patent application Ser. No. 12/730,198, entitled "Virtual Data Storage System Optimizations", filed 23 Mar. 2010, which is herein incorporated by reference in its entirety for all purposes.

One example technique is to prefetch portions of the high-level data structure entity based on their adjacency or close proximity to the identified portion of the entity. For example, if step 225 determines that the requested storage block corresponds with a portion of a file from file offset 0 up to offset 4095, then step 230 may identify a second portion of this same file beginning with offset 4096 for prefetching. It should be noted that although these two portions are adjacent in the high-level data structure entity, their corresponding storage blocks may be non-contiguous.

Another example technique is to identify the type of high-level data structure entity, such as a file of a specific format, a directory in a file system, or a database table, and apply one or more heuristics to identify additional portions of this high-level data structure entity or a related high-level data structure entity for prefetching. For example, applications employing a specific type of file may frequently access data at a specific location within these files, such as at the beginning or end of the file. Using knowledge of this application or entity-specific behavior, step 230 may identify these frequently accessed portions of the file for prefetching.

Yet another example technique monitors the times at which high-level data structure entities are accessed. High-level data structure entities that are accessed at approximately the same time are associated together by the virtual storage array architecture. If any one of these associated high-level data structure entities is later accessed again, an embodiment of step 230 identifies one or more associated high-level data structure entities that were previously accessed at approximately the same time as the requested high-level data structure entity for prefetching. For example, a storage client may have previously requested storage blocks from files A, B, and C at approximately the same time, such as within a minute of each other. Based on this previous access pattern, if step 225 determines that a requested storage block is associated with file A, step 230 may identify all or portions of files B and C for prefetching.

In still another example technique, step 230 analyzes the high-level data structure entity associated with the requested storage block to identify related portions of the same or other high-level data structure entity for prefetching. For example, application files may include references to additional files, such as overlay files or dynamically loaded libraries. Similarly, a database table may include references to other database tables. Once step 225 identifies the high-level data structure entity associated with a requested storage block, step 230 may use an analysis of this high-level data structure entity to identify additional referenced high-level data structure entities. The referenced high-level data structure entities may be prefetched. In an embodiment, the analysis of high-level data structure entities for references to other high-level data structure entities may be performed asynchronously with method 200.

Step 230 identifies all or portions of one or more high-level data structure entities for prefetching based on the high-level data structure entity associated with the requested storage block. However, as discussed above, storage clients specify data access requests in terms of storage blocks, not high-level data structure entities such as files, directories, or database tables. Thus, step 235 identifies one or more storage blocks corresponding with the high-level data structure entities identified for prefetching in step 230. In an embodiment, step 235 provides the ISSD with identifiers for one or more high-level data structure entities, such as the inodes of files or similar identifiers for other types of file systems or database storage structures. Optionally, step 235 also provides an offset, file location, or other type of address identify a specific portion of a high-level data structure entity to be prefetched. In response, the ISSD returns an identifier of one or more storage blocks associated with the high-level data structure entities. These identified storage blocks are used to store the high-level data structure entities or portions thereof.

Decision block 240 determines if the storage blocks identified in step 235 have already been stored in the storage block read cache located at the branch location. In an embodiment, the storage block access optimizer at the data center maintains a record of all of the storage blocks that have copies stored in the storage block read cache. In an alternate embodiment, the storage block access optimizer queries the branch location virtual storage array interface to determine if copies of these identified storage blocks have already been stored in the storage block read cache.

In still a further embodiment, decision block 240 and the determination of whether an additional storage block has been previously retrieved and cached may be omitted. Instead, this embodiment can send all of the additional storage blocks identified by step 235 to the branch location virtual storage array interface to be cached. This embodiment can be used when WAN latency, rather than WAN bandwidth limitations, are an overriding concern.

If all of the identified storage blocks from step 235 are already stored in the storage block read cache, then method 200 proceeds from decision block 240 back to step 205 to await receipt of further storage block requests.

If some or all of the storage blocks identified in step 235 are not already stored in the storage block read cache, then step 245 retrieves these uncached storage blocks from the virtual storage array data located in a physical data storage on the data center LAN. The retrieved storage blocks are sent via the WAN connection from the data center location to the branch location. In an embodiment of step 245, the data center virtual storage array interface receives a request for the uncached identified storage blocks from the storage block access optimizer and, in response, accesses the physical data storage array to retrieve these storage blocks. The data center virtual storage array interface then forwards these storage blocks to the branch location virtual storage array interface via the WAN connection.

Step 250 stores the storage blocks identified for prefetching in the storage block read cache. In an embodiment of step 250, the branch location virtual storage array interface receives one or more storage blocks from the data center virtual storage array interface via the WAN connection and stores these storage blocks in the storage block read cache. Following step 250, method 200 proceeds to step 205 to await receipt of further storage block requests. The storage blocks added to the storage block read cache in previous iterations of method 200 may be available for fulfilling storage block read requests.

Method 200 may be performed by a branch virtual data storage array interface, by a data center virtual data storage array interface, or by both virtual data storage array interfaces working in concert. For example, steps 205 to 220 of method 200 may be performed by a branch location virtual storage array interface and steps 225 to 250 of method 200 may be performed by a data center virtual storage array interface. In another example, all of the steps of method 200 may be performed by a branch location virtual storage array interface.

FIG. 2B illustrates a method 255 of performing policy-based prefetching of storage blocks according to an embodiment of the invention. Step 260 selects a high-level data structure entity for analysis. Examples of a selected high-level data structure entities include a file, directory, and other file system entity such as an inode, as well as database entities such as tables, records, and B-tree nodes or other structures.

Step 265 analyzes the selected high-level data structure entity to identify additional portions of the same high-level data structure entity or all or portions of additional high-level data structure entities that are likely to be requested by the storage client. There are a number of different techniques for identifying addition high-level data structures or portions thereof for prefetching that may be used by embodiments of step 265. Some of these are described in detail in U.S. patent application Ser. No. 12/730,198, entitled "Virtual Data Storage System Optimizations", filed 23 Mar. 2010, which is herein incorporated by reference in its entirety for all purposes.

One example technique is to identify the type of entity, such as a file of a specific format, a directory in a file system, or a database table, and apply one or more heuristics to identify additional portions of this high-level data structure entity or a related high-level data structure entity for prefetching. For example, applications employing a specific type of file may frequently access data at a specific location within these files, such as at the beginning or end of the file. Using knowledge of this application or entity-specific behavior, step 265 may identify the beginning or end portions of these types of files for prefetching.

In another example technique, step 265 analyzes the high-level data structure entity associated with the requested storage block to identify related portions of the same or other high-level data structure entity for prefetching. For example, application files may include references to additional files, such as overlay files or dynamically loaded libraries. Similarly, a database table may include references to other database tables. Step 265 may use an analysis of this high-level data structure entity to identify additional referenced high-level data structure entities. The referenced high-level data structure entities may be prefetched.

In still another example technique, step 265 may analyze application, virtual machine, or operating system specific files or other high-level data structure entities to identify additional high-level data structure entities for prefetching. For example, step 265 may analyze application or operating system log files to identify the sequence of files accessed during operations such a system or application start-up. These identified files may then be selected for prefetching.

Once step 265 has identified one or more high-level data structure entities or portions thereof for prefetching, step 270 identifies all or portions of one or more high-level data structure entities for prefetching based on the high-level data structure entity associated with the requested storage block. However, as discussed above, storage clients specify data access requests in terms of storage blocks, not high-level data structure entities such as files, directories, or database tables. In an embodiment, step 270 provides the ISSD with identifiers for one or more high-level data structure entities, such as the inodes of files or similar identifiers for other types of file systems or database storage structures. Optionally, step 270 also provides an offset, file location, or other type of address identify a specific portion of a high-level data structure entity to be prefetched. In response, the ISSD returns an identifier of one or more storage blocks associated with the high-level data structure entities. These storage blocks are used to store the high-level data structure entities or portions thereof.

Decision block 275 determines if the storage blocks identified in step 270 have already been stored in the storage block read cache located at the branch location. In an embodiment, the storage block access optimizer at the data center maintains a record of all of the storage blocks that have copies stored in the storage block read cache. In an alternate embodiment, the storage block access optimizer queries the branch location virtual storage array interface to determine if copies of these identified storage blocks have already been stored in the storage block read cache.

In still a further embodiment, decision block 275 and the determination of whether an additional storage block has been previously retrieved and cached may be omitted. Instead, this embodiment can send all of the additional storage blocks identified by step 270 to the branch location virtual storage array interface to be cached. This embodiment can be used when WAN latency, rather than WAN bandwidth limitations, are an overriding concern.

If all of the identified storage blocks from step 270 are already stored in the storage block read cache, then method 255 proceeds from decision block 275 to step 280. Optional step 280 determines if there are additional high-level data structure entities that should be included in the analysis of method 255, based on the results of step 265. For example, if steps 260 and 265 analyze a first file and identify a second file that should be prefetched, step 285 may include this second file in a list of high-level data structure entities to be analyzed by method 255, potentially identifying additional files from the analysis of this second file.

If some or all of the storage blocks identified in step 270 are not already stored in the storage block read cache, then step 285 retrieves these uncached storage blocks from the virtual storage array data located in a physical data storage on the data center LAN. The retrieved storage blocks are sent via the WAN connection from the data center location to the branch location. In an embodiment of step 280, the data center virtual storage array interface receives a request for the uncached identified storage blocks from the storage block access optimizer and accesses the physical data storage array to retrieve these storage blocks. The data center virtual storage array interface then forwards these storage blocks to the branch location virtual storage array interface via the WAN connection.

Step 290 stores the storage blocks identified for prefetching in the storage block read cache. In an embodiment of step 290, the branch location virtual storage array interface receives one or more storage blocks from the data center virtual storage array interface via the WAN connection and stores these storage blocks in the storage block read cache. Following step 290, method 255 proceeds to step 285. The storage blocks added to the storage block read cache in previous iterations of method 255 may be available for fulfilling storage block read requests.

Following step 280 or, if step 280 is omitted, decision block 275 or step 290, an embodiment of method 255 proceeds to step 260 to select another high-level data structure entity for analysis.

In an embodiment, steps 285 and 290 may be performed asynchronously or in parallel with further iterations of method 255. For example, a storage block access optimizer may direct the data center virtual storage array interface to retrieve one or more storage blocks. While this operation is being performed, the storage block access optimizer may continue with the execution of method 255 by proceeding to optional step 280 to identify further high-level data structure entities for analysis, and/or returning to step 260 for an additional iteration of method 255. When the data center virtual storage array interface has completed its retrieval of one or more storage blocks as requested, step 290 may be performed in the background and in parallel to transfer these storage blocks via the WAN to the branch location for storage in the storage block read cache.

Method 255 may be performed by a branch virtual data storage array interface, by a data center virtual data storage array interface, or by both virtual data storage array interfaces working in concert. For example, steps 260 to 285 of method 255 may be performed by a data center virtual storage array interface. In another example, all of the steps of method 255 may be performed by a branch location virtual storage array interface.

Embodiments of both methods 200 and 255 utilize the ISSD to identify high-level data structure entities from storage blocks and/or to identify storage blocks from their associated high-level data structure entities. An embodiment of the invention creates the ISSD by initially searching high-level data structure entities, such as a master file table, allocation table or tree, or other types of file system metadata structures, to identify the high-level data structure entities corresponding with the storage blocks. An embodiment of the invention may further recursively analyze other high-level data structure entities, such as inodes, directory structures, files, and database tables and nodes, that are referenced by the master file table or other high-level data structures. This initial analysis may be performed by either the branch location or data center virtual storage array interface as a preprocessing activity or in the background while processing storage client requests. In an embodiment, the ISSD may be updated frequently or infrequently, depending upon the desired prefetching performance. Embodiments of the invention may update the ISSD by periodically scanning the high-level data structure entities or by monitoring storage client activity for changes or additions to the virtual storage array, which is then used to update the affected portions of the IS SD.

As described above, embodiments of the invention prefetch storage blocks from the data center storage array and cache these storage blocks in a storage block cache located at the branch location. In some embodiments, the storage block cache may be smaller than the virtual storage array. Thus, when the storage block cache is full, the branch or data center virtual storage array interface may need to occasionally evict or remove some storage blocks from the storage block cache to make room for other prefetched storage blocks. In an embodiment, the branch virtual storage array interface may use any cache replacement scheme or policy known in the art, such as a least recently used (LRU) cache management policy.

In another embodiment, the storage block cache replacement policy of the storage block cache is based on an understanding of the relationship between storage blocks and corresponding high-level data structure entities, such as file system or database entities. In this embodiment, even though the storage block cache operates on the basis of storage blocks, the storage block cache replacement policies determine whether to retain or evict storage blocks in the storage block cache based on their associations to files or other high level data structure entities.

For example, when a virtual storage array interface needs to evict storage blocks from the storage block cache to create free space for other prefetched storage blocks, an embodiment of the virtual storage interface uses information associating storage blocks with corresponding files to evict all of the storage blocks associated with a single file, rather than evicting some storage blocks from one file and some from another file. In this example, storage blocks are not necessarily evicted based on their own usage alone, but on the overall usage of their associated file or other high-level data structure entity.

As another example, the storage block cache may elect to preferentially retain storage blocks including file system metadata and/or directory structures over other storage blocks that include file data only.

In yet another example, the storage block cache may identify files or other high-level data structure entities that have not been accessed recently, and then use the ISSD to identify and select the storage blocks corresponding with these infrequently used files for eviction.

Although these examples of storage block cache replacement policies are discussed with reference to file and file systems, similar techniques can be applied to databases and other types of high-level data structure entities.

In addition to selectively evict storage blocks based on their associated high-level data structure entities, an embodiment of the virtual array storage system can also include cache policies to preferentially retain or "pin" specific storage blocks in the storage block cache, regardless of their usage or other factors. These cache retention policies can ensure that specific storage blocks are always accessible at the branch location, even at times when the WAN is unavailable, since copies of these storage blocks will always exist in the storage block cache.

In this embodiment, a user, administrator, or administrative application may specify all or a portion of the virtual storage array for preferential retention or pinning in the storage block cache. Upon receiving a request to pin some or all of the virtual storage array data in the storage block cache, the virtual storage array system needs to determine if the storage block cache has sufficient additional capacity to store the specified storage blocks. If the storage block cache has sufficient capacity, the virtual storage array system is allowed to reserves space in the storage block cache for the specified storage blocks; otherwise this request is denied.

If the storage block cache has sufficient capacity to satisfy the pinning request, the cache also may initiate a proactive prefetch process to retrieve any requested storage blocks that are not already in the storage block cache from the data center via the WAN. For large pinning requests, such as an entire virtual storage array, it may take hours or days for this proactive prefetch to be completed. In a further embodiment, this proactive prefetching of pinned storage blocks may be performed asynchronously and at a lower priority than storage clients' requests for virtual storage array read operations, associated prefetching (discussed above), and the virtual storage array write operations (discussed below). This embodiment may be used to deploy data to a new branch location. For example, upon activation of the branch storage array interface, the virtual storage array data is copied asynchronously via the WAN to the branch location storage block cache. Although this data transfer may take some time to complete, storage clients at this new branch location can access virtual storage array data immediately using the virtual storage array read and write operations, with the above-described storage block prefetching hiding the bandwidth and latency limitations of the WAN when storage clients access storage blocks that have yet to be copied to the branch location.

In another embodiment, the storage block cache may allow users, administrators, and administration applications the ability to directly specify the pinning of high-level data structure entities, such as files or database elements, as opposed to specifying storage blocks for pinning in the storage block cache. In this embodiment, the virtual storage array uses the ISSD to identify storage blocks corresponding with the specified high-level data structure entities. In a further embodiment, the virtual storage array may allow user, administrators, and administrative applications to specify only a portion of high-level data structure entities for pinning, such as file metadata and frequently used indices within high-level data structure entities. The virtual storage array then uses the associations between storage blocks and high-level data structure entities from the ISSD to identify specific storage blocks to be pinned in the storage block cache.

Figure 3:
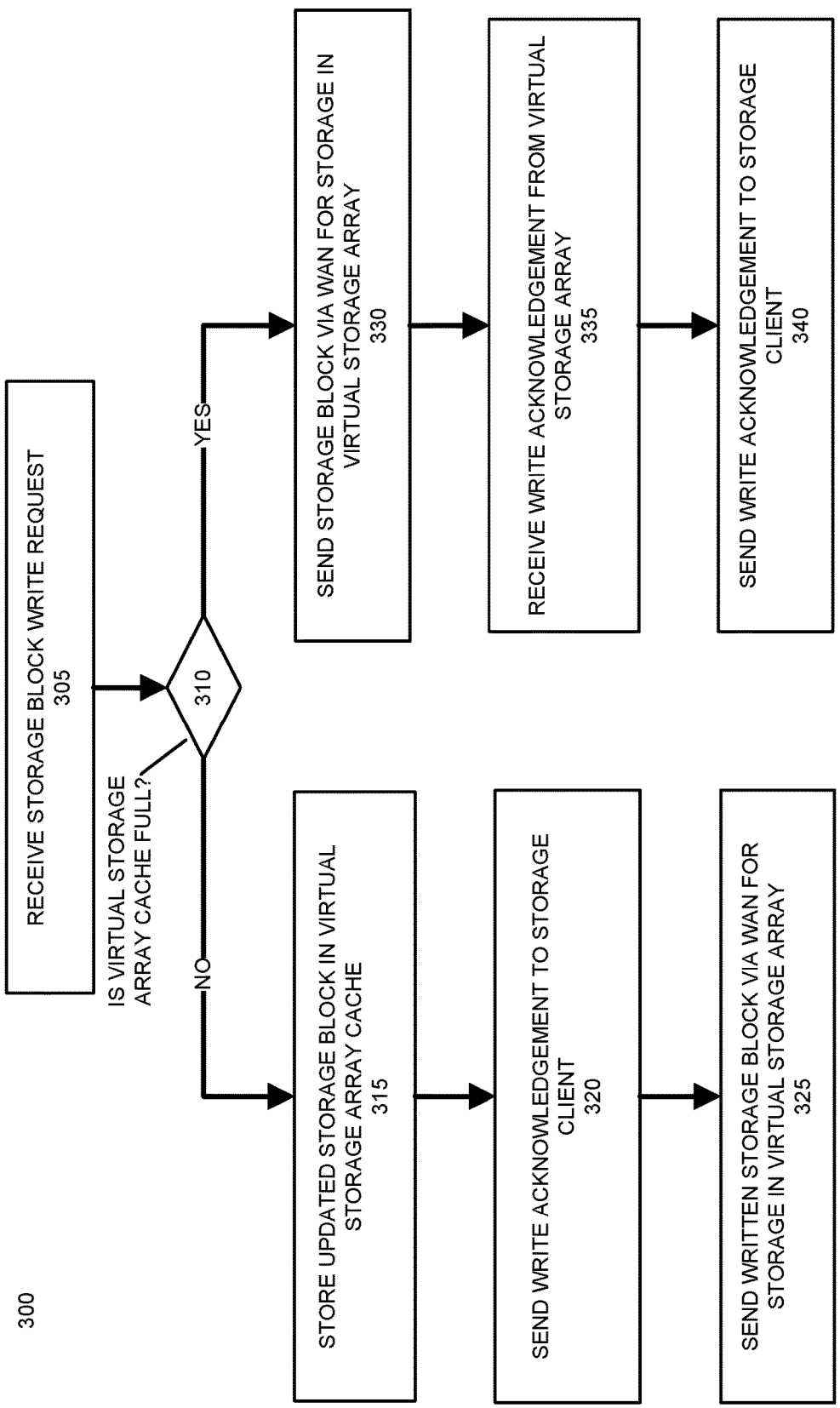
FIG. 3 illustrates a method of processing storage block write requests to improve virtualized data storage system performance according to an embodiment of the invention.

Similarly, the virtual storage array cache can be used to hide latency and bandwidth limitations of the WAN during virtual storage array writes. FIG. 3 illustrates a method 300 of processing storage block write requests to improve virtualized data storage system performance according to an embodiment of the invention.

An embodiment of method 300 starts with step 305 receiving a storage block write request from a storage client within the branch location LAN. The storage block write request may be received from a storage client by a branch location virtual storage interface.

In response to the receipt of the storage block write request, decision block 310 determines if the storage block write cache in the virtual storage array cache at the branch location is capable of accepting additional write requests or is full. In an embodiment, the virtual storage array cache may use some or all of its storage as a storage block write cache for pending virtual storage array write operations.

If the storage block write cache in the virtual storage array cache can accept an additional storage block write request, then step 315 stores the storage block write request, including the storage block data to be written, in the storage block write cache. Step 320 then sends a write acknowledgement to the storage client. Following the storage client's receipt of this write request, the storage client believes its storage block write request is complete and can continue to operation normally. Step 325 then transfers the queued written storage block via the WAN to the physical storage array at the data center LAN. This transfer may occur in the background and asynchronously with the operation of storage clients.

While a storage block write request is queued in the storage block write cache and waiting to be transferred to the data center, a storage client may wish to access this storage block for a read or an additional write. In this situation, the virtual storage array interface intercepts the storage block access request. In the case of a storage block read, the virtual storage array interface provides the storage client with the previously queued storage block. In the case of a storage block write, the virtual storage array interface will update the queued storage block data and send a write acknowledgement to the storage client for this additional storage block access.

Conversely, if decision block 310 determines that the storage block read cache cannot accept an additional storage block write request, then step 330 immediately transfers the storage block via the WAN to the physical storage array at the data center LAN. In an embodiment of step 335, the branch location virtual storage array interface receives a write confirmation that the storage block write operation is complete. This confirmation may be received from a data center virtual storage array interface or directly from a physical storage array or other data storage device. Following completion of this transfer, step 340 sends a write acknowledgement to the storage client, allowing the storage client to resume normal operation.

In a further embodiment, a branch location virtual storage array interface may throttle storage block read and/or write requests from storage clients to prevent the virtual storage array cache from filling up under typical usage scenarios.

To prevent data loss or corruption in the face of unexpected events such as power failures, typical file systems and databases issue data writes to block storage devices in a specific order and with certain dependencies to maintain internal consistency of structures and ensure the desired semantics for modifications. For example, most transactional databases employ write ahead logging techniques when modifying index structures, so that in case of failure, any operations that are logged but not completed can be replayed upon restart.

Embodiments of the virtual storage array use write order preservation to maintain data consistency. In these embodiments, the storage block cache tracks the order in which write requests are received and can use this ordering information when forwarding the storage block write requests to the physical storage array via the WAN, as described by step 325.

FIGS. 4A-4C illustrate three write order preservation policies according to an embodiment of the invention. FIG. 4A illustrates the contents of an example storage block write WAN queue 400. Storage block write WAN queue 400 is used by embodiments of a branch virtual storage array interface to schedule the transmission of storage blocks written by storage clients at the branch location from the storage block write cache to the physical storage array at the data center location. In the example storage block write WAN queue 400, a sequence of ten write operations from one or more branch storage clients is recorded. For each write operation in this example sequence, the storage block write WAN queue 400 includes a reference to the storage block written by this write operation. For example, the first or earliest write operation received, write operation 1, is a write to storage block 4 and the last write or most recent write operation received, write operation 10, is a write to storage block 5.

In an embodiment of the invention, a first write order preservation policy is to preserve the semantics of the original file system, database, or other high-level data structure entity by forwarding all block write requests over the WAN to the physical storage array in the same order that they were received by the virtual array storage cache. Thus, the branch virtual storage array interface will communicate written storage blocks to the physical storage array at the data center via the WAN in the same sequence as shown in example storage block write WAN queue 400.

When using this policy, the image of the file system or database that exists on the physical storage array is always an internally consistent replica of the modifications made by storage clients at some point in time. Additionally, snapshots of the virtual storage array data, such as snapshots A and B, are guaranteed to be internally consistent, because they include all of the write operations prior to the snapshot time. However, if the same storage blocks are written to multiple times prior to their transfer to the physical storage array, this write order preservation policy requires the storage block write cache to keep track of multiple versions of these storage blocks and forward all of the write operations to these different versions of the storage block in the order received. Moreover, this policy requires more WAN bandwidth because every version of a storage block in the storage block write WAN queue must be forwarded to the data center, even if these versions are superseded by more recent versions of the storage block already in the storage block write WAN queue. For example, in storage block write WAN queue 400, storage block 3 is written to in write operations 2, 4, and 7. Thus, the storage block write cache must transmit all three of these versions of storage block 3 in the order that they were received.

In another embodiment of the invention, a second write order preservation policy forwards only the most recently written version of each storage block in the storage block write cache. FIG. 4B illustrates an example storage block WAN transmission order 405 according to this embodiment of the invention. Example storage block WAN transmission order 405 is based on the example storage block writes WAN queue 400 shown in FIG. 4A. In example storage block WAN transmission order 405, only the most recent versions of each storage block in storage block writes WAN queue 400 are communicated to the data center via the WAN. For example, write operation 5 in storage block writes WAN queue 400 is the most recent version of storage block 4. Similarly, write operations 7, 8, 9, 10 in storage block writes WAN queue 400 are the most recent version of storage block 3, 1, 2, and 5, respectively. Thus, storage block operations 5, 7, 8, 9, and 10 are the only write operations in storage block writes WAN queue 400 that need to be transmitted to the physical storage array at the data center, as shown by example storage block WAN transmission order 405. The remaining storage block write operations in the storage block writes WAN queue 400 may be discarded.

The most recent version policy shown by FIG. 4B reduces the WAN bandwidth required, because multiple versions of the same storage block need not be transmitted. However, by ignoring the write ordering dependencies of the original sequence of write operations, the virtual storage array data on the physical storage array may not be internally consistent until all of the write operations in the storage block write cache have been processed, if necessary, and transmitted back to the physical storage device at the data center.

Additionally, this policy does not preserve consistent snapshots of the virtual storage array, because some write operations prior to a snapshot may be omitted from the storage block WAN transmission order 405 if there are further writes to the same storage block after the snapshot time. For example, write operations 1, 2, and 3 from the storage block writes WAN queue 400, which occur before the time of snapshot A, are omitted from the storage block WAN transmission order 405. Thus, snapshot A will not be internally consistent because it is missing the most recent version of storage blocks 4, 3, and 1 prior to the time of snapshot A.

In another embodiment of the invention, a third write order preservation policy forwards the most recently written versions of storage blocks before each snapshot time. FIG. 4C illustrates an example storage block WAN transmission order 410 according to this embodiment of the invention. Example storage block WAN transmission order 410 is based on the example storage block writes WAN queue 400 shown in FIG. 4A. In example storage block WAN transmission order 410, the most recent versions of each storage block before each snapshot time in storage block writes WAN queue 400 are communicated to the data center via the WAN.

For example, storage block writes WAN queue 400 includes two snapshot times, snapshot A and snapshot B. For each snapshot time, an embodiment of the storage block write cache forwards only the most recent version of storage blocks updated by write operations prior to this snapshot time. For example, storage block 4 is updated by write operations 1 and 3 and storage block 3 is updated by write operation 2 prior to snapshot time A. In this example, the storage block WAN transmission order 410 output by the storage block write cache will include write operations 2 and 3 to update storage blocks 3 and 4, reflecting the most recent updates of these storage blocks prior to the snapshot time A. In this example, write operation 1 is omitted because the write operation 3 is a more recent update the same storage block before the snapshot time A.

Similarly, the storage block WAN transmission order 410 includes write operations 5, 6, and 7, reflecting the most recent updates of storage blocks 4, 2, and 3, respectively, prior to the snapshot time B. In this example, the storage block WAN transmission order 410 include multiple versions of the same storage block if there is one or more snapshots between the associated write operations. For example, write operations 3 and 5 are both included in storage block WAN transmission order 410 because they update storage block 4 prior to and following the snapshot time A.

Additionally, the storage block WAN transmission order 410 includes write operations 8, 9, and 10, which are the most recent updates to storage blocks 1, 2, and 5, respectively, following snapshot time B.

In this embodiment, although the physical storage array may contain an inconsistent view of the virtual storage array data at some arbitrary points in time, this embodiment ensures that the virtual storage array data will be internally consistent at the times of snapshots.

As discussed above, the data of a virtual storage array may be stored in physical storage array or other data storage device. In some applications, such as with virtual machine applications, the physical storage blocks used by the virtual storage array belong to a virtual machine file system, such as VMFS. In these applications, there may be many layers of abstraction between virtual storage array storage blocks and the high-level data structure entities used by a virtual machine application and its hosted applications. Because of this, embodiments of the invention may perform multiple transformations to identify high-level data structure entities corresponding with given virtual storage array storage blocks and, once these high-level data structure entities are identified, may perform multiple optimizations to attempt to predict and prefetch virtual storage array storage blocks that will be requested by a storage client in the near future.

Figure 5:
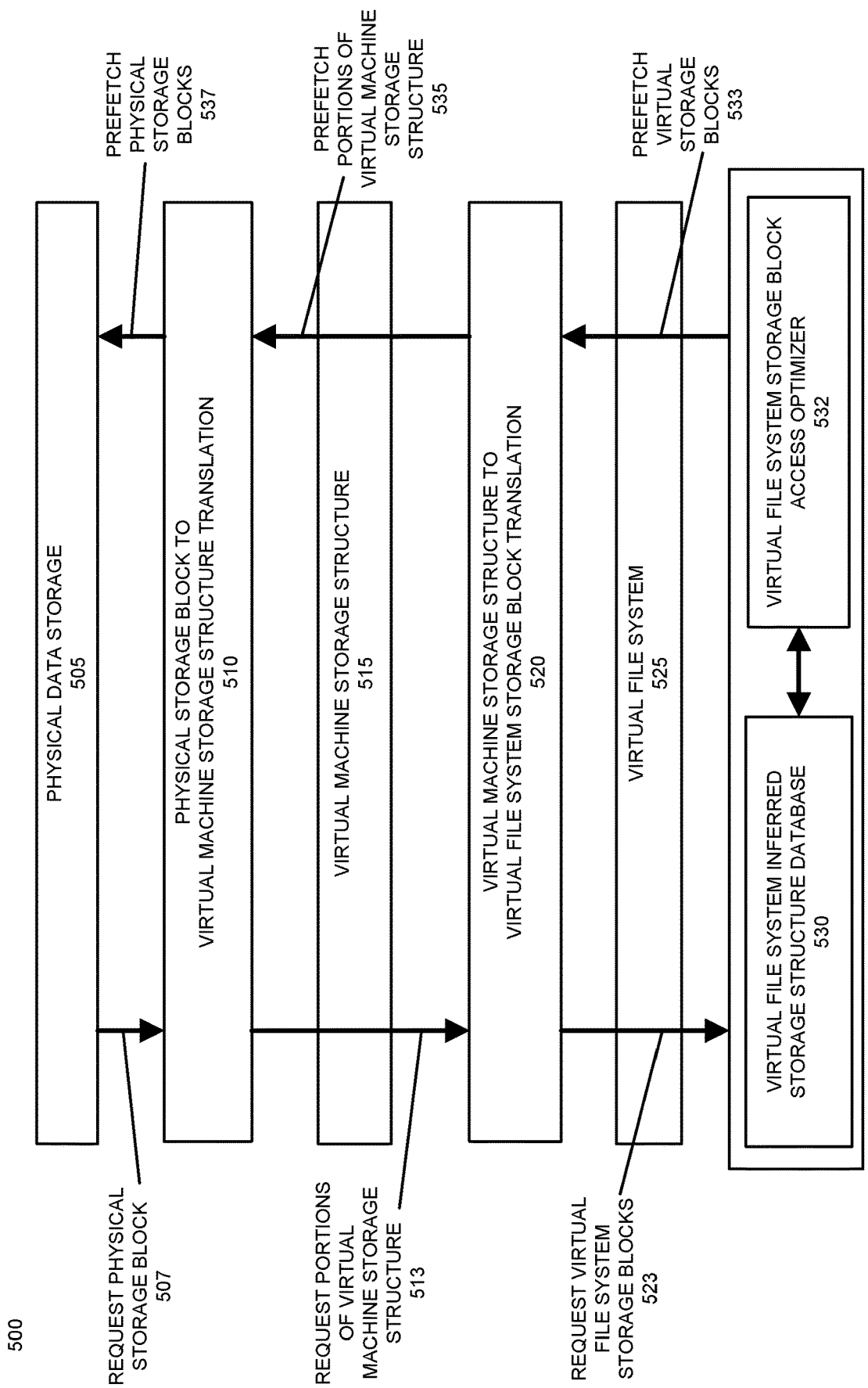
FIG. 5 illustrates an arrangement for recursively applying transformations and optimizations to improve virtualized data storage system performance according to an embodiment of the invention.

FIG. 5 illustrates an example arrangement 500 for successively applying transformations and optimizations to improve virtualized data storage system performance according to an embodiment of the invention. In example 500, successive levels of translation may be used to convert storage block requests to corresponding intermediate level data structure entities and then into corresponding high-level data structure entities. Example arrangement 500 includes a physical data storage system 505, such as a physical data storage array or file server. The physical data storage system 505 may be associated with a file system or volume manager that provides an interface for accessing physical storage blocks. In this example arrangement 500, a virtual storage array interface receives a request for a virtual storage array storage block from a storage client. This request for a virtual storage array storage block is converted by one or more virtual storage array interfaces to a request 507 for a corresponding physical storage block in the physical data storage system 505.

To identify additional physical storage blocks for prefetching, example arrangement 500 includes a physical storage block to virtual machine storage structure translation module 510. Module 510 maps a given physical storage block to a corresponding portion of a virtual machine storage structure 515. For example, virtual machine storage structure 515 may be a VMFS storage volume. The VMFS storage volume appears as a logical storage unit, such as a LUN, to the virtual storage array interface. In this example, the VMFS storage volume may include multiple virtual machine disk images. Although the VMFS storage volume appears as a single logical storage unit to the storage client, each disk image within the VMFS storage volume appears to a virtual machine application as a separate virtual logical storage unit. In this example, module 510 may identify a portion of a virtual logical storage unit within the VMFS storage volume as corresponding with the requested physical storage block.

Module 520 maps the identified portion of a virtual machine storage structure, such as a virtual logical storage unit within a VMFS storage volume, to one or more corresponding virtual file system storage blocks within a virtual file system 525. Virtual file system 525 may be any type of file system implemented within a virtual logical storage unit. Examples of virtual file systems include FAT, NTFS, and the ext family of file systems. For example, a virtual logical storage unit may be a disk image used by a virtual machine application. The disk image represents as data as virtual storage blocks of a virtual data storage device. The virtual storage blocks in this disk image are organized according to the virtual file system 525.

As with physical storage blocks and physical file systems, virtual machine applications and their hosted applications typically access data in terms of files in the virtual file system 525, rather than storage blocks. Moreover, high-level data structure entities within the virtual file system, such as files or directories, may be spread out over multiple non-contiguous virtual storage blocks in the virtual file system 525. Thus, a virtual file system inferred storage structure database 530 and virtual file system block access optimizer 532 leverage an understanding of the semantics and structure of the high-level data structures associated with the virtual storage blocks to predict which virtual storage blocks are likely to be requested by a storage client in the near future. The virtual file system ISSD 530 and virtual file system block access optimizer 532 are similar to the ISSD and block access optimizer, respectively, for physical data storage discussed above.

In arrangement 500, the virtual file system block access optimizer 532 receives an identification of one or more virtual storage blocks in the virtual file system 525 that correspond with the requested physical storage block in request 507. The virtual file system block access optimizer 532 uses the virtual file system ISSD 530 to identify one or more virtual file system high-level data structure entities, such as virtual file system files, corresponding with these virtual file system storage blocks. The virtual file system block access optimizer 532 uses its knowledge of the high-level data structure entities and reactive and/or policy-based prefetching techniques to identify one or more additional high-level data structure entities or portions thereof for prefetching. The virtual file system block access optimizer 532 then uses the virtual file system ISSD 530 to identify additional virtual storage blocks in the virtual file system 525 corresponding with these additional high-level data structure entities or portions thereof. The additional virtual storage blocks in the virtual file system 525 are selected for prefetching.

Once the virtual file system block access optimizer 532 has selected one or more virtual file system storage blocks for prefetching, a request 533 for these virtual file system storage blocks is generated. In an embodiment of arrangement 500, module 520 translates the prefetch request 533 for virtual file system storage blocks into an equivalent prefetch request 535 for a portion of the virtual machine storage structure. Then, module 510 translates the prefetch request 525 for a portion of the virtual machine storage structure into an equivalent prefetch request 537 for physical storage blocks in the physical data storage system 505. The physical storage blocks indicated by request 537 correspond with the virtual file system storage blocks from request 533. These requested physical storage blocks may be retrieved from the physical data storage system 505 and communicated via the WAN to a branch location virtual storage array interface for storage in a storage block read cache.

Arrangement 500 is one example for successively applying transformations and optimizations to improve virtualized data storage system performance according to an embodiment of the invention. Further embodiments of the invention may apply any number of successive transformations to physical storage blocks to identify associated high-level data structure entities. Additionally, once one or more associated high-level data structure entities have been identified, embodiments of the invention may apply optimizations at the level of high-level data structure entities or at any lower level of abstraction. For example, optimizations may be performed at the level of virtual machine file system files, virtual machine file system storage blocks, virtual machine storage structures, physical storage blocks, and/or at any other intermediate data structure level of abstraction.

Figure 6:
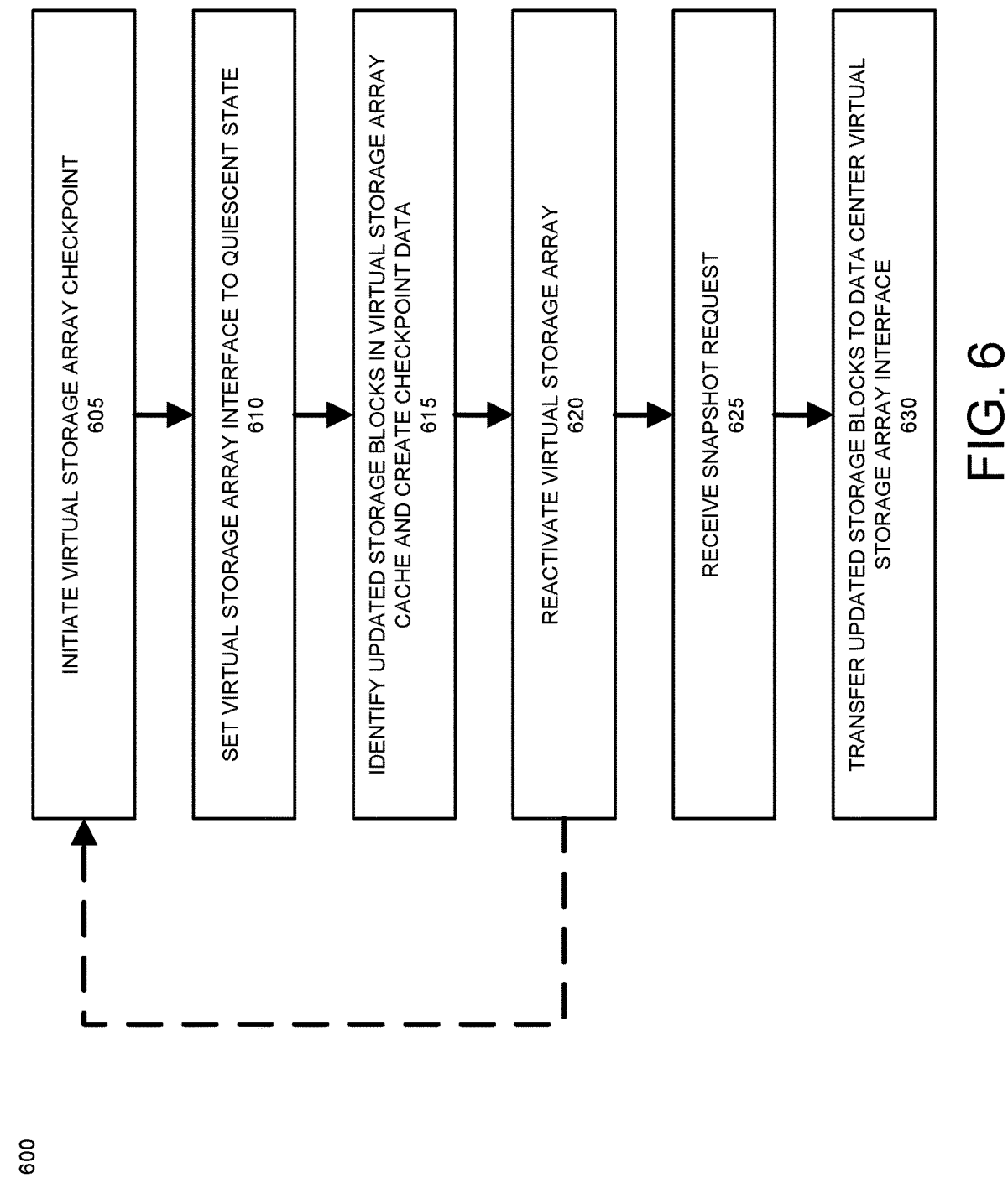
FIG. 6 illustrates a method of creating a data storage snapshot in a virtualized data storage system performance according to an embodiment of the invention.

FIG. 6 illustrates a method 600 of creating a data storage snapshot in a virtualized data storage system performance according to an embodiment of the invention. Method 300 begins with step 605 initiating of a virtual storage array checkpoint. A virtual storage array checkpoint may be initiated automatically by a branch location virtual storage array interface according to a schedule or based on criteria, such as the amount of data changed since the last checkpoint. In a further embodiment, a virtual storage array checkpoint may be initiated in response to a request for a virtual storage array snapshot from a system administrator or administration application.

To create a virtual storage array checkpoint, step 610 sets the branch location virtual storage array interface to a quiescent state. This entails completing any pending operations with storage clients (though not necessarily background operations between the branch location and data center virtual storage array interfaces, such as transferring new or updated storage blocks from the storage block write cache to the data center via the WAN). While in the quiescent state, the branch location virtual storage interface will not accept any new storage operations from storage clients.

Once the branch location virtual storage array interface is set to a quiescent state, step 615 identifies new or updated storage blocks in the branch location virtual storage array cache. These new or updated storage blocks include data that has been created or updated by storage clients but have yet to be transferred via the WAN back to the data center LAN for storage in the physical data storage array.

Once all of the updated storage blocks have been identified, step 615 creates a checkpoint data structure. The checkpoint data structure specifies a time of checkpoint creation and the set of new and updated storage blocks at that moment of time. Following the creation of the checkpoint data structure, step 620 reactivates the branch location's virtual storage array. The branch location virtual storage array interface can resume servicing storage operations from storage clients. Additionally, the branch location virtual storage array interface may resume transferring new or updated storage blocks via the WAN to the data center LAN for storage in the physical data storage array. In a further embodiment, the virtual storage array cache may maintain a copy of an updated storage block even after a copy is transferred back to the data center LAN for storage. This allows subsequent snapshots to be created based on this data.

In an embodiment, following the reactivation of the virtual storage array, the branch location virtual storage array interface preserves the updated storage blocks specified by the checkpoint data structure from further changes. If a storage client attempts to update a storage block that is associated with a checkpoint, an embodiment of the branch location virtual storage array interface creates a duplicate of this storage block in the virtual storage array cache to store the updated data. By making a copy of this storage block, rather than replacing it with further updated data, this embodiment preserves the data of this storage block at the time of the checkpoint for potential future reference.

Optionally, an embodiment of method 600 may initiate one or more additional virtual storage array checkpoints at later times or in response to criteria or conditions. Embodiments of the branch location virtual storage array interface may maintain any arbitrary number of checkpoint data structures and automatically delete outdated checkpoint data structures. For example, a branch location virtual storage interface may maintain only the most recently created checkpoint data structure, or checkpoint data structures from the beginning of the most recent business day and the most recent hour.

At some point, a system administrator or administration application may request a snapshot of the virtual storage array data. A snapshot of the virtual storage array data represents the complete set of virtual storage array data at a specific moment of time. Step 625 receives a snapshot request. In response to a snapshot request, step 630 transfers a copy of the appropriate checkpoint data structure from the branch location virtual storage array interface to the data center virtual storage array interface. Additionally, step 630 transfers a copy of any updated storage blocks specified by this checkpoint data structure from the branch location virtual storage array interface to the data center virtual storage array interface for storage in the physical storage array.

In an embodiment of step 630, the data center virtual storage array interface creates a snapshot of the data of the virtual storage array. The snapshot includes a copy of all of the virtual storage array data in the physical data storage array unchanged from the time of creation of the checkpoint data structure. The snapshot also includes a copy of the updated storage blocks specified by the checkpoint data structure. An embodiment of the data center virtual storage array interface may store the snapshot in the physical storage array or using a data backup. In an embodiment, the data center virtual storage array interface automatically sends storage operations to the physical storage array interface to create a snapshot from a checkpoint data structure. These storage operations can be carried out in the background by the data center virtual storage array interface in addition to translating virtual storage array operations from one or more branch location virtual storage array interfaces into corresponding physical storage array operations.

Figure 7:
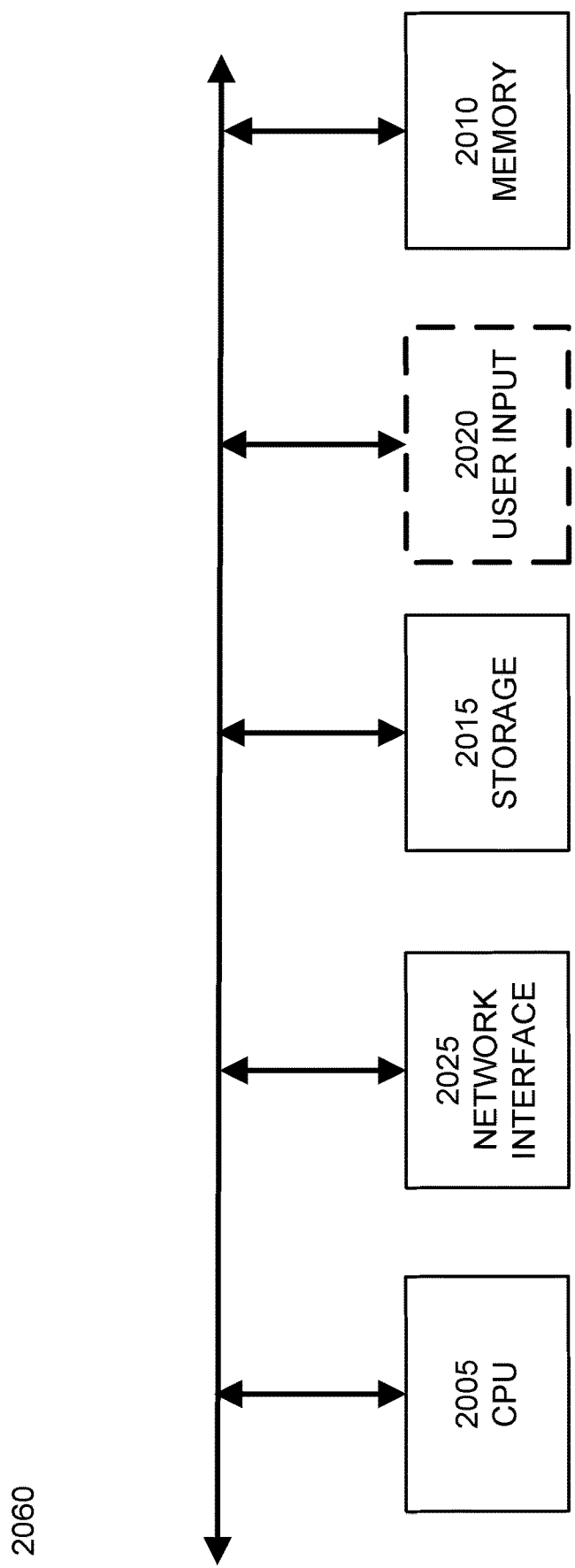
FIG. 7 illustrates an example computer system capable of a virtualized data storage system device according to an embodiment of the invention.

Embodiments of the invention can implement virtual storage array interfaces at the branch and/or data center as standalone devices or as part of other devices, computer systems, or applications. FIG. 7 illustrates an example computer system capable of implementing a virtual storage array interface according to an embodiment of the invention. FIG. 7 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices. In an embodiment, storage 2015 includes multiple storage devices configured to act as a storage array for improved performance and/or reliability. In a further embodiment, storage 2015 includes a storage array network utilizing a storage array network interface and storage array network protocols to store and retrieve data. Examples of storage array network interfaces suitable for use with embodiments of the invention include Ethernet, Fibre Channel, IP, and InfiniB and interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of optimizing a block storage protocol write access to a block storage device via a wide area network, the method comprising:
   receiving a sequence of storage block write operations;
   selecting, by using a processor, a first storage block write operation included in the sequence of storage block write operations, wherein the first storage block operation includes a first version of a storage block;
   determining whether the sequence of storage block write operations includes a second storage block write operation including a second version of the storage block, wherein the second storage block write operation is more recent than the first storage block write operation, and wherein the determining whether the sequence of storage block write operations includes the second storage block write operation including the second version of the storage block comprises searching the sequence of storage block write operations from a time associated with the first storage block write operation up to a snapshot time;
   in response to the determination that the sequence of storage block write operations does not include the second storage block write operation including the second version of the storage block, communicating the first version of the storage block via a wide area network to a data storage connected with the wide area network at a first network location;
   in response to the determination that the sequence of storage block write operations includes the second storage block write operation including the second version of the storage block, communicating the second version of the storage block via the wide area network to the data storage;
   determining whether the sequence of storage block write operations after the snapshot time includes a third storage block write operation including a third version of the storage block, wherein the third storage block write operation is more recent than the second storage block write operation; and
   in response to the determination that the sequence of storage block write operations includes the third storage block write operation including the third version of the storage block, communicating the third version of the storage block via the wide area network to the data storage.

2. The method of claim 1, comprising:
   in response to receiving the sequence of storage block requests, caching the sequence of storage block requests in a storage block cache; and
   following the communication of the second version of the storage block to the data storage, removing the first storage block write operation and the first version of the storage block from the storage block cache.

3. The method of claim 2, wherein the storage block cache is connected with the wide-area network at a second network location, the method comprising:
   following the communication of the second version of the storage block to the data storage, retaining the first version of the storage block in the storage block cache for read access by a storage client connected with the wide-area network at the second location.

4. The method of claim 1, wherein the determining whether the sequence of storage block write operations includes the second storage block write operation including the second version of the storage block comprises:
  searching the sequence of storage block write operations from a time associated with the first storage block write operation up to an end of the sequence of storage block write operations.

5. A non-transitory computer-readable storage medium storing instructions that, when executed by a computer, cause the computer to perform a method of optimizing a block storage protocol write access to a block storage device via a wide area network, the method comprising:
  receiving a sequence of storage block write operations;
  selecting a first storage block write operation included in the sequence of storage block write operations, wherein the first storage block operation includes a first version of a storage block;
  determining whether the sequence of storage block write operations includes a second storage block write operation including a second version of the storage block, wherein the second storage block write operation is more recent than the first storage block write operation, and wherein the determining whether the sequence of storage block write operations includes the second storage block write operation including the second version of the storage block comprises searching the sequence of storage block write operations from a time associated with the first storage block write operation up to a snapshot time;
  in response to the determination that the sequence of storage block write operations does not include the second storage block write operation including the second version of the storage block, communicating the first version of the storage block via a wide area network to a data storage connected with the wide area network at a first network location;
  in response to the determination that the sequence of storage block write operations includes the second storage block write operation including the second version of the storage block, communicating the second version of the storage block via the wide area network to the data storage;
  determining whether the sequence of storage block write operations after the snapshot time includes a third storage block write operation including a third version of the storage block, wherein the third storage block write operation is more recent than the second storage block write operation; and
  in response to the determination that the sequence of storage block write operations includes the third storage block write operation including the third version of the storage block, communicating the third version of the storage block via the wide area network to the data storage.

6. The non-transitory computer-readable storage medium of claim 5, comprising:
  in response to receiving the sequence of storage block requests, caching the sequence of storage block requests in a storage block cache; and
  following the communication of the second version of the storage block to the data storage, removing the first storage block write operation and the first version of the storage block from the storage block cache.

7. The non-transitory computer-readable storage medium of claim 6, wherein the storage block cache is connected with the wide-area network at a second network location, the method comprising:
  following the communication of the second version of the storage block to the data storage, retaining the first version of the storage block in the storage block cache for read access by a storage client connected with the wide-area network at the second location.

8. The non-transitory computer-readable storage medium of claim 5, wherein the determining whether the sequence of storage block write operations includes the second storage block write operation including the second version of the storage block comprises:
  searching the sequence of storage block write operations from a time associated with the first storage block write operation up to an end of the sequence of storage block write operations.

9. An apparatus, comprising:
  a processor; and
  a non-transitory computer-readable storage medium storing instructions that, when executed by the processor, cause the apparatus to perform a method of optimizing a block storage protocol write access to a block storage device via a wide area network, the method comprising:
  receiving a sequence of storage block write operations;
  selecting a first storage block write operation included in the sequence of storage block write operations, wherein the first storage block operation includes a first version of a storage block;
  determining whether the sequence of storage block write operations includes a second storage block write operation including a second version of the storage block, wherein the second storage block write operation is more recent than the first storage block write operation, and wherein the determining whether the sequence of storage block write operations includes the second storage block write operation including the second version of the storage block comprises searching the sequence of storage block write operations from a time associated with the first storage block write operation up to a snapshot time;
  in response to the determination that the sequence of storage block write operations does not include the second storage block write operation including the second version of the storage block, communicating the first version of the storage block via a wide area network to a data storage connected with the wide area network at a first network location;
  in response to the determination that the sequence of storage block write operations includes the second storage block write operation including the second version of the storage block, communicating the second version of the storage block via the wide area network to the data storage;
  determining whether the sequence of storage block write operations after the snapshot time includes a third storage block write operation including a third version of the storage block, wherein the third storage block write operation is more recent than the second storage block write operation; and
  in response to the determination that the sequence of storage block write operations includes the third storage block write operation including the third version of the storage block, communicating the third version of the storage block via the wide area network to the data storage.

10. The apparatus of claim 9, comprising:
- in response to receiving the sequence of storage block requests, caching the sequence of storage block requests in a storage block cache; and
- following the communication of the second version of the storage block to the data storage, removing the first storage block write operation and the first version of the storage block from the storage block cache.

11. The apparatus of claim 10, wherein the storage block cache is connected with the wide-area network at a second network location, the apparatus comprising:
- following the communication of the second version of the storage block to the data storage, retaining the first version of the storage block in the storage block cache for read access by a storage client connected with the wide-area network at the second location.

12. The apparatus of claim 9, wherein the determining whether the sequence of storage block write operations includes the second storage block write operation including the second version of the storage block comprises:
- searching the sequence of storage block write operations from a time associated with the first storage block write operation up to an end of the sequence of storage block write operations.

\* \* \* \* \*